United States Patent [19]
Corma Canos et al.

[11] Patent Number: 5,972,204
[45] Date of Patent: Oct. 26, 1999

[54] PHOSPHOROUS-CONTAINING ZEOLITE WITH STRUCTURAL TYPE CON, ITS PREPARATION AND ITS USE FOR CATALYTIC CRACKING

[75] Inventors: Avelino Corma Canos, Valencia, Spain; Eric Benazzi, Chatou; Hervé Caufriez, Bougival, both of France; Maria José Diaz Cabanas, Valencia, Spain; Maria Sol Grande Casas, Valencia, Spain; Miguel Angel Camblor Fernandez, Valencia, Spain; Gil Mabilon, Carrieres Sur Seine, France

[73] Assignee: Institut Francais du Petrole, Rueil-Malmaison, France

[21] Appl. No.: 09/014,424

[22] Filed: Jan. 27, 1998

[30] Foreign Application Priority Data

Jan. 27, 1997 [FR] France ............... 97/00.980

[51] Int. Cl.$^6$ ............... C10G 11/05; B01J 29/70
[52] U.S. Cl. ............ 208/114; 208/120.01; 502/60; 502/63; 502/64; 502/67
[58] Field of Search ............... 208/114, 120.01; 502/60, 63, 64, 67

[56] References Cited

U.S. PATENT DOCUMENTS

| 4,963,337 | 10/1990 | Zones | 423/277 |
| 5,110,776 | 5/1992 | Chitnis et al. | 502/64 |
| 5,472,594 | 12/1995 | Tsang et al. | 208/114 |

FOREIGN PATENT DOCUMENTS

| 89/09185 | 10/1989 | WIPO . |
| 95/07859 | 3/1995 | WIPO . |

OTHER PUBLICATIONS

Zones et al., "Boron–beta zeolite hydrothermal conversions: the influence of template structure and of boron concentration and source", *Microporous Materials,* vol. 2, pp. 543–555, 1994.

Lobo et al., "CIT–1: A New Molecular Sieve with Intersecting Pores Bounded by 10–and 12–Rings", *J. Am. Chem. Soc.,* vol. 117, pp. 3766–3779, 1995.

*Primary Examiner*—Thomas Dunn
*Attorney, Agent, or Firm*—Millen, White, Zelano, & Branigan, P.C.

[57] ABSTRACT

A phosphorous-containing zeolite with structural type CON in its aluminosilicate or borosilicate form contains at most 10% by weight of phosphorous. A process for its preparation is described, starting from existing zeolites (SSZ-26, SSZ-33 or CIT-1) or from beta zeolites and an organic structuring agent or template which is 1-N,N,N-trimethyl adamantammonium hydroxide or 2-N,N,N-trimethyl adamantammonium hydroxide. The zeolite is used for catalytic cracking of hydrocarbon feeds.

19 Claims, No Drawings

PHOSPHOROUS-CONTAINING ZEOLITE WITH STRUCTURAL TYPE CON, ITS PREPARATION AND ITS USE FOR CATALYTIC CRACKING

BACKGROUND OF THE INVENTION

The present invention relates to a novel large pore multi-dimensional phosphorous-containing zeolite with structural type CON, its preparation and its use, in particular in a process for catalytic cracking of a hydrocarbon feed. More precisely, it relates to a borosilicate molecular sieve which can be transformed into an aluminosilicate and stabilized by at least one phosphorous-containing compound.

Zeolitic molecular sieves are crystalline materials comprising a network of three-dimensional $TO_4$ tetrahedra where T is Si, Al, B, P, Ge, Ti, Ga, Fe, for example. This network defines a microporous intracrystalline network with dimensions which are comparable to those of small to medium organic molecules. The microporous network can be a system of channels and/or cavities, shaped by the crystalline network, and which can be identified by its particular and specific X ray diffraction diagram.

The potential applications of a zeolite (for example in catalysis, adsorption, cation exchange and purification processes) depend principally on the size, shape and characteristics (uni-, multi-dimensional) of their microporous network and their chemical composition. As an example, in aluminosilicate type zeolites, the presence of $AlO_4^-$ tetrahedra isolated in a matrix of $SiO_4$ tetrahedra requires the presence of compensation cations to counter-balance the negative charge of the framework. These cations are typically highly mobile and can be exchanged with others, for example $H^+$ or $NH_4^+$, the latter being able to be transformed into $H^+$ by calcining, resulting in an acidic microporous solid. The zeolite is then in its acid form also known as its hydrogen form. When all of the compensating cations are organic alkylammonium or ammonium cations, calcining leads directly to the acid form of the zeolite. Such microporous acidic solids can be used in acid catalysis processes and their activity and selectivity depend on the strength of the acid, on the size and the on dimensional characteristics of the space delimited in the framework, in which the acidic sites are found.

The channel size can be described by the number of $TO_4$ tetrahedra present in the ring delimiting the pore openings, which element controls the diffusion of molecules. Thus the channels are classified into categories: small pore openings (annular pore openings delimited by a sequence 8 $TO_4$ tetrahedra (8 MR, medium pores (10 MR) and large pores (12 MR), MR standing for membered ring.

The prior art is illustrated in U.S. Pat. No. 5,110,776, International patent application WO-A-9507859 and the publication by S. I. Zones et al., "Boron-beta zeolite hydrothermal conversions: The influence of template structure and boron concentration and source", Microporous Material, Elsevier, vol. 2, 1994, Amsterdam, NL, pages 543–555.

Of the numerous zeolites which have already been described in the literature, zeolites with structural type CON, i.e., SSZ26 zeolite (PCT/US 89/01179, 1989), SSZ-33 zeolite U.S. Pat. No. 4,963,337) and CIT-1 zeolite (J. Am. Chem. Soc., 1995, 117, 3766) are of interest as they are the only synthetic zeolites known to possess an interconnected medium (10 MR) and large (12MR) pore system.

This structural characteristic can result in interesting form selectivity properties in such materials for heterogeneous catalysis. The term "form selectivity" is generally used to explain specific catalytic selectivities due to steric constraints which exists inside the microporous zeolitic system. Such constraints can affect the reactants (diffusion of reactants in the zeolite), the reaction products (formation and diffusion of the formed products from the zeolite), the reaction intermediates or the reactional transition states which form in the micropores of the zeolite during the reactions. The presence of appropriate steric constraints can in some cases prevent the formation of reaction intermediates and transition states leading to the formation of unwanted products and can in some cases improve selectivities.

The family of 10/12 MR zeolites consists of intergrowths of two polymorphs in different proportions. The differences between the SSZ-26, SSZ-33 and CIT-1 zeolites originate from the preparation method, chemical composition (zeolites/as synthesized) and the relative proportion of polymorphs in the intergrowth. Thus CIT-1 and SSZ-33 zeolites each belong to the category of as synthesized borosilicate materials. The term "as synthesised" means any zeolite obtained directly from its preparation with no intermediate modification. CIT-1 zeolite is substantially constituted by a single polymorph, while SSZ-33 is an intergrowth. SSZ-26 zeolite is an alumino-silicate constituted by an intergrowth.

The silica-alumina composition of the three structures appears to be similar. However, their preparation (that of SSZ-26 and CIT-1) requires expensive structuring agents (templates) and lengthy synthesis processes. Thus SSZ-26 zeolite has been described in U.S. Pat. No. 4,910,006 and U.S. Pat. No. 4,963,337 describes SSZ-33 borosilicate, in its aluminium form, hereby incorporated by reference.

Such zeolites are synthesised in the presence of alkaline ions supplied by sodium hydroxide. These ions must be eliminated by at least one ion exchange step, for example using ammonium cations, and a calcining step, which complicates the preparation process and renders it more expensive.

SUMMARY OF THE INVENTION

We have discovered a preparation method which can overcome these disadvantages, in which the SSZ-33 form containing boron is first synthesised as a precursor for the phosphorous-containing zeolite with structural type CON, using a novel structuring agent (template), 1-N,N,N-trimethyl adamantammonium hydroxide (1-TMAda$^+$, OH$^-$), diagram 1, which is cheaper, and is carried out in the absence of sodium ions.

Diagram 1

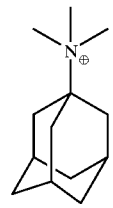

The boron form is then exchanged with aluminium with an excellent degree of exchange to obtain SSZ-26 (aluminosilicate).

We have also observed that 2-N,N,N-trimethyl adamantammonium hydroxide (2-TMAda$^+$, OH$^-$), diagram 2, can be used as a template.

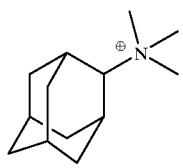

Diagram 2

The invention also relates to a novel phosphorous-containing zeolite with structural type CON, methods for its preparation and its use in catalytic cracking, used alone or mixed with a conventional cracking catalyst.

The catalyst of the present invention is particularly suitable for cracking petroleum fractions to produce a large quantity of compounds containing 3 and/or 4 carbon atoms per molecule, especially propylene and butenes. The catalyst of the present invention is particularly suitable for cracking heavy petroleum fractions.

The present invention also relates to a process for cracking heavy petroleum fractions, in the presence of the catalyst defined above, also too processes for preparing the catalyst. Cracking hydrocarbon feeds to obtain high yields of very good quality motor gasoline was begun in the petroleum industry at the end of the 1930s. The introduction of fluid bed processes (FCC, i.e., Fluid Catalytic Cracking) or moving bed processes (such as TCC) in which the catalysts continuously circulate between the reaction zone and the regenerator (where it is freed of coke by combustion in the presence of a gas containing oxygen), constituted a great advance over the fixed bed technique.

Since the beginning of the 1960s, the most widely used catalysts in cracking units have been zeolites, normally with a faujasite structure. Such zeolites, incorporated in an amorphous matrix, for example constituted by amorphous silica-alumina, and which can contain clays in a variety of proportions, are characterized by hydrocarbon cracking activities which are 1000 to 10,000 times higher than those of silica-alumina catalysts which are rich in silica which were used up to the end of the 1950s.

Near the end of the 1970s, the crude oil shortage and an increasing demand for high octane number gasoline led refiners to treat heavier and heavier crudes. Treating these latter constitutes a difficult problem for the refiner because of their high level of catalyst poisons, in particular metallic compounds (especially nickel and vanadium), unusual Conradson carbon numbers and, in particular, asphaltene compounds.

This need to treat heavy feeds and other more recent problems such as the gradual but general removal of lead based additives from gasoline, and the slow but substantial increase in demand for middle distillates (kerosines and gas oils) in some countries have also prompted refiners to research improved catalysts which can in particular satisfy the following aims:

catalysts which are thermally and hydrothermally more stable and more tolerant towards metals;

which can produce less coke for an identical conversion;

which can produce a gasoline with a higher octane number;

which has improved selectivity for middle distillates.

In the majority of cases, the production of light gases comprising compounds containing 1 to 4 carbon atoms per molecule is intended to be minimised and as a consequence, catalysts are designed to limit the production of such light cases.

However, in some particular cases demand for light hydrocarbons containing 2 to 4 carbon atoms per molecule, or some of them such as $C_3$ and/or $C_4$ hydrocarbons, more particularly propylene and butenes, has grown to a substantial level.

The production of a large quantity of butenes is of particular interest when the refiner can use an alkylation unit, for example for $C_3$–$C_4$ cuts containing olefins, to form an additional quantity of high octane number gasoline.

Thus the global high quality gasoline yield obtained from the starting hydrocarbon cuts is substantially increased.

The production of propylene is particularly desirable in some developing countries where there is a high demand for such a product.

The catalytic cracking process can satisfy this demand to a certain extent provided that, in particular, the catalyst is adapted to such a production. One effective method of adapting the catalyst consists of adding an active agent to catalytic masses, the active agent having the following two qualities:

1. it can crack heavy molecules with good hydrocarbon selectivity for 3 and/or 4 carbon atoms, in particular to propylene and butenes;

2. it must be sufficiently resistant to the severe steam partial pressure and temperature conditions which prevail in the regenerator of the industrial cracker.

Research work carried out by the applicant on numerous zeolites has led to the surprising discovery that a zeolite with structural type CON, preferably SSZ-26 zeolite, prepared in accordance with the invention, then modified by adding phosphorous, can produce a catalyst with excellent stability which has good selectivity for the production of hydrocarbons containing 3 and/or 4 carbon atoms per molecule. The use of such a zeolite of the invention can produce a cracking catalyst which can produce a larger proportion of gas, in particular propylene and butenes.

More particularly, the invention concerns a multi-dimensional phosphorous-containing zeolite with structural type CON, comprising medium pores (10 MR) and large pores (12 MR), containing at most 10% by weight of phosphorous and having a powder X ray diffraction diagram after calcining which is substantially identical to that given in Table 1.

TABLE 1

X ray diffraction diagram of a molecular sieve with structural type CON (for example borosilicate or aluminosilicate) after calcining

| 2θ (degrees) (Bragg angle) | Relative intensity $I/I_0$ |
|---|---|
| 7.85–7.95 | vs |
| 8.21–8.40 | w to m |
| 9.05–9.12 | w |
| 13.20–13.40 | w |
| 14.20–14.32 | w |
| 19.67–19.95 | w |
| 20.27–20.60 | s to vs |
| 21.36–21.63 | w to m |
| 22.03–22.23 | m to s |
| 22.89–22.75 | m |
| 23.06–23.33 | s to vs |
| 25.23–25.63 | w |
| 26.50–27.00 | m to s |
| 28.55–28.87 | w |
| 28.98–29.26 | w to m |
| 29.90–30.10 | w |
| 30.46–30.79 | w |
| 33.32–33.64 | w |

TABLE 1-continued

X ray diffraction diagram of a molecular sieve with structural
type CON (for example borosilicate or aluminosilicate) after calcining

| 2θ (degrees)<br>(Bragg angle) | Relative intensity<br>I/I₀ |
|---|---|
| 36.25–36.46 | vw to w |
| 36.77–36.91 | vw to w | very weak (vw) means less than 10;
weak (w) means less than 20;
medium (m) means in the range 20 to 40;
strong (s) means in the range 40 to 60;
very strong (vs) means more than 60.

The phosphorous content in the zeolite with structural type CON is advantageously at most 5%, by weight, for example in the range 1% to 2%.

The calcined phosphorous-containing zeolite of the invention can be in a borosilicate form (Table 2).

TABLE 2

X ray diffraction diagram of a borosilicate with structural
type CON after calcining

| 2θ (degrees)<br>(Bragg angle) | Relative intensity<br>I/I₀ |
|---|---|
| 7.93 | vs |
| 8.23 | w to m |
| 9.07 | w |
| 13.40 | w |
| 14.31 | w |
| 15.45 | vw |
| 16.82 | vw |
| 19.93 | w |
| 20.58 | vs |
| 21.61 | m |
| 22.21 | s to vs |
| 23.32 | vs |
| 25.62 | w to m |
| 26.99 | s to vs |
| 28.87 | w to m |
| 29.26 | m |
| 30.04 | w |
| 30.78 | w to m |
| 31.94 | w |
| 32.47 | w |
| 33.62 | w to m |
| 35.86 | w |
| 36.26 | w |
| 36.77 | w |
| 37.38 | w | very weak (vw) means less than 10;
weak (w) means less than 20;
medium (m) means in the range 20 to 40;
strong (s) means in the range 40 to 60;
very strong (vs) means more than 60.

It can also be in an aluminosilicate form (Table 3).

TABLE 3

X ray diffraction diagram of a aluminosilicate with structural
type CON after calcining

| 2θ (degrees)<br>(Bragg angle) | Relative intensity<br>I/I₀ |
|---|---|
| 7.87 | vs |
| 8.40 | w |
| 9.11 | w |
| 13.20 | w |
| 14.22 | w |
| 20.29 | m |
| 21.38 | w |
| 22.05 | m |
| 22.84 | m |
| 23.08 | m to s |
| 25.23 | w |
| 26.52 | m |
| 28.56 | w |
| 28.98 | w |
| 33.34 | w | very weak (vw) means less than 10;
weak (w) means less than 20;
medium (m) means in the range 20 to 40;
strong (s) means in the range 40 to 60;
very strong (vs) means more than 60.

The Si/Al atomic ratio of the aluminosilicate form of the zeolite can be in the range 5 to 500, advantageously in the range 7 to 300, and more preferably in the range 10 to 200. In its borosilicate form, the Si/B atomic ratio can have the same values.

The invention also relates to a process for preparing the phosphorous-containing zeolite with structural type CON.

In general, at least one zeolite precursor with structural type CON, which has optionally been calcined, is impregnated under suitable conditions with an aqueous solution of at least one acid selected from the group formed by $H_3PO_3$, $H_3PO_4$, $(NH_4)_2HPO_4$, $(NH_4)H_2PO_4$ or one of its salts. The product obtained is calcined at a temperature of 350° C. to 700° C.

The zeolite precursor in its aluminosilicate form can be a SSZ-26 zeolite described in U.S. Pat. No. 4,910,006, hereby incorporated by reference. SSZ-33 zeolite in its boron form as described in U.S. Pat. No. 4,963,337, hereby incorporated by reference, can also be used as a precursor, exchanged with aluminium, to produce a SSZ-26 type zeolite. Finally, a CIT-1 zeolite can be used as a precursor, exchanged with aluminium, as described in J. Am. Chem. Soc., 1995, 3766.

In its borosilicate form, SSZ-33 or CIT-1 zeolite described in the above references can be used as a precursor to prepare the phosphorous-containing zeolite with structural type CON of the invention.

However, the phosphorous-containing zeolite of the invention can be prepared using other templates. Thus in a first implementation, the zeolite precursor with structural type CON is prepared in its aluminosilicate form using the following steps:

a) a beta zeolite with structural type BEA containing boron (borosilicate) is brought into reactional contact in the substantial absence of alkaline ions with an organic template which is 1-N,N,N-trimethyl adamantammonium hydroxide (1-TMAda⁺, OH⁻). The reaction medium is heated to a suitable temperature which is in the range 60° C. to 220° C. The contact conditions are:

a B/Si atomic ratio in the range 0.02 to 0.2;
a template/Si atomic ratio in the range 0.15 to 0.4, preferably in the range 0.19 to 0.35;
a $H_2O$/Si ratio in the range 20 to 60, preferably in the range 30 to 50;

b) the product from step a) is calcined then brought into contact with an acidic aluminium solution to form the aluminosilicate, or the product from step a) is brought into contact with an acidic solution then heated and brought into contact with an acidic aluminium solution to form the aluminosilicate.

In a second implementation of the process, the zeolite precursor with structural type CON is prepared in its aluminosilicate form using the following steps:

a) a beta zeolite with structural type BEA containing boron (borosilicate) is brought into contact in the substantial absence of alkaline ions with an organic template which is 2-N,N,N-trimethyl adamantammonium hydroxide (2-TMAda$^+$, OH$^-$). The reaction medium is heated to a suitable temperature which is in the range 60° C. to 220° C.

b) the product from step a) is calcined then brought into contact with an acidic aluminium solution to form the aluminosilicate, or the product from step a) is brought into contact with an acidic solution then heated and the heated product is brought into contact with an acidic aluminium solution to form the aluminosilicate.

The conditions in step a) are:

a B/Si atomic ration in the range 0.02 to 0.2;

a template/Si ratio in the range 0.15 to 0.4, preferably in the range 0.19 to 0.35;

a H$_2$O/Si ratio in the range 20 to 60, preferably in the range 30 to 50.

The term "substantial absence of alkaline ions" means a medium generally containing a Na/Si weight ratio of <0.005 corresponding to impurities present in the reactants, in other words a medium in which there is no intentional addition of alkaline ions.

These two implementations are of particular advantage as the absence of alkaline ions avoids at least one ion exchange step using a solution of ammonium ions, for example, also a calcining step to obtain the acid form.

In a third implementation of the process, a zeolite precursor with structural type CON is prepared in its aluminosilicate form using the following steps:

a) a beta zeolite with structural type BEA containing boron (borosilicate) is brought into contact in the substantial presence of alkaline ions with an organic template which is 2-N,N,N-trimethyl adamantammonium hydroxide (2-TMAda$^+$, OH$^-$). The reaction medium is heated to a suitable temperature which is in the range 60° C. to 220° C.

b) the product from step a) is calcined then brought into contact with an acidic aluminium solution to form the aluminosilicate, or the product from step a) is brought into contact with an acidic solution then heated and the heated product is brought into contact with an acidic aluminium solution to form the aluminosilicate.

The conditions in step a) are:

a B/Si atomic ration in the range 0.06 to 0.2, preferably 0.1 to 0.2;

a template/Si ratio in the range 0.10 to 0.4, preferably in the range 0.15 to 0.35;

a H$_2$O/Si ratio in the range 20 to 60, preferably in the range 30 to 50.

The phosphorous-containing zeolite in its borosilicate form can be prepared using other templates other than those described for SSZ-33 zeolite in its boron form to synthesise the zeolite precursor.

Thus in a first implementation, a zeolite precursor with structural type CON in its borosilicate form can be prepared by bringing a beta zeolite with structural type BEA containing boron (borosilicate) into contact in the substantial absence of alkaline ions with an organic template which is 1-N,N,N-trimethyl adamantammonium hydroxide, heating to a suitable temperature in the range 60° C. to 220° C. and calcining the product obtained.

The contact conditions are:

a B/Si atomic ration in the range 0.02 to 0.2;

a template/Si ratio in the range 0.15 to 0.4, preferably in the range 0.19 to 0.35;

a H$_2$O/Si ratio in the range 20 to 60, preferably in the range 30 to 50.

In a second implementation of the process, the zeolite precursor with structural type CON in its borosilicate form can be prepared by bringing a beta zeolite with structural type BEA containing boron (borosilicate) into contact in the substantial absence of alkaline ions with an organic template which is 2-N,N,N-trimethyl adamantammonium hydroxide, and heating to a suitable temperature in the range 60° C. to 220° C.

The contact conditions are:

a B/Si atomic ration in the range 0.02 to 0.2;

a template/Si ratio in the range 0.15 to 0.4, preferably in the range 0.19 to 0.35;

a H$_2$O/Si ratio in the range 20 to 60, preferably in the range 40 to 50, and the product is calcined.

Finally, in a third implementation of the process, the precursor zeolite with structural type CON in its borosilicate form is prepared as follows:

bringing a beta zeolite with structural type BEA containing boron (borosilicate) into contact in the substantial presence of alkaline ions with an organic template which is 2-N,N,N-trimethyl adamantammonium hydroxide, and heating to a suitable temperature in the range 60° C. to 220° C.

The contact conditions are:

a B/Si atomic ration in the range 0.06 to 0.2, preferably 0.1 to 0.2;

a template/Si ratio in the range 0.10 to 0.4, preferably in the range 0.15 to 0.35;

a H$_2$O/Si ratio in the range 20 to 60, preferably in the range 30 to 50, and the product is calcined.

According to these modes of preparation, a template/Si atomic ratio in the range 0.22 to 0.28, preferably in the range 0.24 to 0.26, is advantageously used.

The zeolite composition of the invention can be used or mixed with other materials which are resistant to the temperatures and other conditions used in hydrocarbon conversion processes, as described in U.S. Pat. No. 4,910,006 for catalytic cracking.

As an example, the phosphorous-impregnated zeolite with structural type CON of the invention can be used with inorganic oxide matrices or in combination with conventional catalytic cracking catalysts. Examples are Y zeolite which includes ultrastable Y zeolite (modified and steam stabilized), X zeolite, beta zeolite, ZSM-5 zeolites, silicalites, and LZ10 and LZ210 type zeolites.

The catalyst of the present invention also comprises at least one matrix which is normally amorphous or of low crystallinity selected, for example, from the group formed by alumina, silica, magnesia, clay, titanium oxide, zirconia, combinations of at least two of these compounds, and alumina-born oxide combinations.

The matrix is preferably selected from the group formed by silica, alumina, magnesia, silica-alumina mixtures, silica-magnesia mixtures and clay.

The catalytic composition used for catalytic cracking of hydrocarbon feeds can be prepared suing any of the methods which are known to the skilled person.

Thus the composition can be obtained by simultaneous incorporation of the phosphorous-containing zeolite with structural type CON in its hydrogen form with Y zeolite using conventional methods for preparing catalytic cracking catalysts containing a zeolite.

The catalyst can also be obtained by mechanically mixing a first product containing a matrix and a Y zeolite, and a second product comprising the phosphorous-containing zeolite with structural type CON in its hydrogen form as described above with a matrix which can be identical or different to that contained in the first product. This mechanical mixture is normally formed using dry products. The products are preferably dried by spray-drying, for example at a temperature of 100° C. to 500° C. normally for 0.1 to 30 seconds.

After spray drying, these products can still contain about 1% to 30% by weight of volatile material (water and ammonia).

The Y zeolite—matrix mixture used to prepare the catalyst used in the process of the present invention is normally a conventional prior art catalytic cracking catalyst (for example a commercially available catalyst); the phosphorous-containing zeolite with structural type CON described above can then be considered as an additive which can be used as it is, with a view to mixing it with the conventional cracking catalyst defined above, or it may already have been incorporated in a matrix, the matrix—phosphorous-containing zeolite with structural type CON ensemble then constituting the additive which is mixed with the conventional catalytic cracking catalyst defined above, after suitable forming, for example by mechanically mixing grains containing the phosphorous-containing zeolite with structural type CON and grains of a conventional cracking catalyst.

The catalytic composition thus prepared and used for cracking can contain:

a) 0 to 60% by weight, for example 0.1% to 60%, preferably 4% to 50% and more preferably 10% to 40%, of at least one zeolite other than the zeolite of the invention, preferably a Y zeolite with a faujasite structure;

b) 0.01% to 60%, preferably 0.05% to 40%, more preferably 0.1% to 20%, of at least one zeolite with structural type CON in its hydrogen form having the characteristics given above; and c) the complement being constituted by at least one matrix.

The general conditions for catalytic cracking reactions are well known and do not need to be repeated here (see, for example, U.S. Pat. Nos. 3,293,192; 3,449,070; 4,415,438; 3,518,051 and 3,607,043, hereby incorporated by reference).

With the aim of producing the largest possible quantity of gaseous hydrocarbons containing three and/or four carbon atoms per molecule, in particular propylene and butenes, it is sometimes advantageous to slightly increase the temperature at which cracking is carried out, for example from 10° C. to 50° C. The catalyst used in the process of the present invention is, however, usually sufficiently active for such a temperature increase not to be necessary. The other cracking conditions are unchanged with respect to those used in the prior art.

The catalytic cracking conditions are generally as follows:
contact time in the range 1 to 10,000 milliseconds;
catalyst to feed weight ratio (C/F) in the range 0.5 to 50;
temperature in the range 400° C. to 800° C.;
pressure in the range 0.5 to 10 bars (1 bar=$10^5$ Pa).

The following examples illustrate the invention without in any way limiting its scope.

EXAMPLES

Example 1

Synthesis of a large pore multi-dimensional borosilicate zeolite with structural type CON 7.374 g of a 0.5M solution of 1-N,N,N-trimethyl adamantammonium hydroxide (1-TMAda$^+$, OH$^-$) and 6.813 g of distilled water were mixed and 1 g of a calcined boron-containing beta zeolite with a Si/B atomic ratio of 14.7 was added which had been synthesised as follows:

21.01 g of an ammonium tetraethyl hydroxide solution (35% by weight) was diluted with 7.93 g of water. 0.62 g of boric acid ($H_3BO_3$) was added to the solution obtained and 6 g of Aerosil 200 silica was then also added. The reaction mixture was heated in a Teflon lined steel autoclave at 150° C. for 6 days. The autoclave was stirred at a rate of 60 revolutions per minute. At the end of this period, the product obtained was filtered, washed with distilled water and dried at 100° C. for 6 hours. The X ray diffraction diagram of the solid so prepared was characteristic of a boron-containing beta zeolite.

The initial mixture of 1-N,N,N-trimethyl adamantammonium hydroxide and boron-containing beta zeolite which had been prepared was stirred for 15 minutes. The mixture had the following mole ratios:

B/Si=0.067
1-TMAda$^+$, OH$^-$/Si=0.23
Na/Si=0
OH$^-$/Si=0.23
$H_2O$/Si=46

Crystallization was carried out without stirring in a PTFE lined stainless steel autoclave at 150° C. over 9 days. After this period, the autoclave was cooled and the products were filtered and washed with water.

The zeolite with structural type CON obtained (SSZ-33) had an Si/B atomic ratio of about 17, determined by chemical analysis.

After calcining at 580° C. to eliminate the organic template occluded in the micropores, the zeolite had a micropore volume of 0.2 cm$^3$ g$^1$, determined by nitrogen adsorption at 77K and its X ray diffraction diagram was substantially comparable to that of Table 2.

Example 2

Transformation of large pore borosilicates with structural type CON to large pore aluminosilicates with structural type CON (SSZ-26)

1 g of the calcined borosilicate zeolite of Example 1 was suspended in 50 ml of a 5% by weight Al(NO$_3$)$_3$ solution. The mixture was heated under reflux for 24 hours then filtered, washed with water and dried at 100° C. A 92% exchange of aluminium was obtained. After exchange, the crystallinity of the sample was good, as determined by X ray analysis. The X ray diffraction diagram was substantially comparable to that of Table 3. The presence of a band at 3620 cm$^{-1}$ in the infrared spectrum of the sample after heating to 400° C. in a 10$^{-3}$ Pa vacuum corresponded to acidic OH, Si—(OH)—Al, in the zeolite. Acidic OH is a strong Broensted acid as shown by pyridine adsorption and its desorption at increasing temperatures. The aluminosilicate zeolite with structural type CON obtained was designated CON.

Example 3

Preparation of phosphorous-containing zeolite with structural type Con in accordance with the invention (CON-P1)

The multi-dimensional large pore aluminosilicate prepared in Example 2 was stirred in a suspension of an H$_3$PO$_4$ solution in water (0.0745 g of 85% H$_3$PO$_4$, in 20 ml of water). The ratio of the weight of liquid to zeolite was 10. The suspension was evaporated to dryness at 80° C. and at 20 Torr. After drying, the sample was calcined at 120° C.

The phosphorous content in the zeolite was 1% by weight. The solid obtained was designated CON-P1.

The X ray diffraction diagram was substantially comparable to that of Table 3.

Example 4

Preparation of phosphorous-containing zeolite with structural type CON in accordance with the invention (CON-P2)

A zeolite was prepared as described in Example 3 but using a solution containing 0.149 g of 85% $H_3PO_4$, in 20 ml of water. After drying, the phosphorous content in the zeolite was 2% by weight. The solid obtained was designated CON-P2.

Example 5

Preparation of cracking additives A1, A2 and A3 based on zeolites with structural type CON The structural type CON zeolites prepared in Examples 2, 3 and 4 were first treated with stream at 750° C. for 5 hours before being used to prepare cracking additives, respectively A1, A2 and A3. These were prepared by making a conventional mechanical mixture of 30% by weight of zeolite and 70% by weight of amorphous silica, which had been calcined, with a grain size which was comparable to that of the zeolites with structural type CON in its hydrogen form.

The mixture obtained was pelletized, then reduced to small aggregates using a crusher. The fraction of grains with a size in the range 40 $\mu$m to 200 $\mu$m (1 $\mu$m=$10^{-6}$ m) was then recovered by sieving and constituted the additive. The compositions and zeolites used to prepare the different additives are shown in Table 4.

TABLE 4

| Additives | Zeolite used and % by weight in additive | Example of zeolite preparation |
|---|---|---|
| A1 | CON (30% by weight) | Example 2 |
| A2 | CON-P1 (30% by weight) | Example 3 |
| A3 | CON-P2 (30% by weight) | Example 4 |

Example 6

Preparation of cracking catalyst not in accordance with the invention (comparative)

A USY zeolite with a lattice parameter of 24.26 Å (1 Å=$10^{-10}$ m), which was a faujasite type Y zeolite which had undergone hydrothermal treatment, was formed in the same manner as zeolites with structural type CON using the procedure described in Example 5, in a proportion of 30% by weight of US-Y zeolite and 70% by weight of silica. The catalyst obtained was designated CATo and was not in accordance with the invention.

Example 7

Use of cracking catalysts

Additives A1 A2 and A3 prepared above were mixed in a proportion of 30% by weight of catalyst CATo to obtain catalysts CAT1, CAT2 and CAT3 respectively.

A vacuum gas oil with the characteristics given in Table 5 was cracked in the presence of catalysts Cato, CAT1, CAT2 and CAT3 in a MAT (Microactivity test) unit under the following conditions:

Feed injection period: 30 seconds
Catalyst to feed ratio (C/F): 0.7 and 0.9
Reaction temperature: 520° C.

TABLE 5

| | |
|---|---|
| Density at 60° C. g/cm³ | 0.916 |
| Refractive index at 67° C. | 1.49325 |
| Aniline point | 76 |
| Sulphur (weight %) | 2.7 |
| Nitrogen (weight %) | 0.15 |
| CCR (weight %) | 0.09 |
| Ni (ppb) | 30 |
| V (ppb) | <25 |
| Mean molecular weight | 405 |
| KUOP | 11.84 |
| ASTM D 1160 Distillation | |
| 10% | 400° C. |
| 30% | 411° C. |
| 50% | 425° C. |
| 70% | 449° C. |
| 90% | 489° C. |

The variations in the activity and selectivities observed due to the presence of the zeolite additive are shown in Table 6.

TABLE 6

| Catalyst Additive | CATo | CAT1 CON (% P) (A1) | CAT2 CON-P1 (A2) | CAT3 CON-P2 (A3) |
|---|---|---|---|---|
| C/F | 0.7 | 0.9 | 0.7 | 0.9 | 0.7 | 0.7 |
| wt % conversion | 78 | 86 | 79 | 87 | 87 | 85 |
| C1–C4 gas %* | 19 | 25 | 25.5 | 32.5 | 32.0 | 32.1 |
| Gasoline, %* | 44 | 47 | 41.5 | 42 | 41.9 | 41.8 |
| Gas oil, %* | 9.9 | 8.4 | 8.7 | 7.3 | 6.5 | 6.4 |
| Coke, %* | 3.6 | 4.7 | 2.7 | 3.7 | 2.9 | 2.8 |
| C3⁼, %* | 4.8 | 5.7 | 6.2 | 7.4 | 8.0 | 7.9 |
| ΣC4⁼, %* | 5.1 | 6.2 | 7.1 | 7.6 | 7.8 | 8.5 |

(*% by weight)

The results obtained in Table 6 show that the zeolites of the invention produced catalysts CAT2 and CAT3 which were more active than the catalyst comprising an unmodified phosphorous-containing SSZ-26 zeolite additive and than catalyst CATo with no additive. Less catalyst was used to convert the same quantity of feed. Further, catalysts CAT2 and CAT3 of the invention produced improved yields of propylene ($C_3^=$) and butenes ($\Sigma C4^=$) yields at iso-conversion.

Example 8

Use of a multi-dimensional large pore zeolite of structural type CON modified with phosphorous (1%) as a unique cracking catalyst Additives A1 and A3 prepared in Example 5 were used in this example as a unique cracking catalyst for the hydrocarbon feed of Example 6 under the same operating conditions. The catalytic performances are compared with catalyst CATo and are shown in Table 7.

It can be seen that the zeolite of the invention contained in additive A3 produced more gas, and better yields of propene ($C_3^+$) and butenes ($\Sigma C4^+$), less coke, less gasoline and gas oil at iso-conversion.

TABLE 7

|  | CATo | A1 CON (0% P) | A3 CON (2% P) |
|---|---|---|---|
| % conversion - wt % | 65 | 65 | 65 |
| C1–C4 gas - wt % | 14 | 29.5 | 32 |
| Gasoline - wt % | 37 | 28.2 | 28.1 |
| Gas oil - wt % | 11 | 6 | 5.3 |
| Coke - wt % | 2.3 | 1.7 | 0.8 |
| C3= - wt % | 3.2 | 7.9 | 9.1 |
| ΣC4= - wt % | 3.9 | 10.9 | 12.5 |

Example 9
Preparation of a phosphorous-containing borosilicate with structural type CON The solid prepared in Example 1 was impregnated with phosphorous as described in Example 3 to deposit 1% by weight of phosphorous. After calcining at 580° C., a solid was obtained which had an X ray diffraction diagram which was substantially comparable to Table 2.

Example 10
Preparation of catalyst CAT4, in accordance with the invention, and use of the catalyst for cracking The phosphorous-containing borosilicate with structural type CON prepared in Example 9 was used to prepare a cracking additive A4 as in Example 5 and to prepare a cracking catalyst CAT4 as in Example 7. This catalyst CAT4, tested under the operating conditions described in Example 7, led to improved yields of propene and butenes at iso-conversion compared with catalysts CATo and with respect to a catalyst comprising a SSZ-33 borosilicate (prepared as in Example 1) and containing no phosphorous.

We claim:

1. A phosphorous-containing zeolite with structural type CON, containing at most 10% by weight of phosphorous and having an X ray diffraction diagram after calcining which is substantially identical to that given in Table 1.

2. A zeolite according to claim 1 in aluminosilicate form with a Si/Al atomic ratio which is in the range 5 to 500.

3. A zeolite according to claim 1, in borosilicate form with a Si/B atomic ratio which is in the range 5 to 500.

4. A zeolite according to claim 1, in which the phosphorous content is at most 5% by weight of the zeolite.

5. A process for preparing a phosphorous-containing zeolite with structural type CON according to claim 1, comprising impregnating at least one zeolite precursor with structural type CON, which has optionally been calcined, with an aqueous solution of at least one acid selected from the group consisting of $H_3PO_3$, $H_3PO_4$, $(NH_4)_2HPO_4$, $(NH_4)H_2PO_4$ and a salt thereof and calcining a product obtained.

6. A process according to claim 5, in which the zeolite precursor with structural type CON is in aluminosilicate form and is prepared by a process comprising:
   a) contacting a beta zeolite with structural type BEA containing boron in the substantial absence of alkaline ions with an organic template which is 1,N,N,N-trimethyl adamantammonium hydroxide and heating
   wherein contacting is conducted with
   a B/Si atomic ratio of 0.02 to 0.2;
   a template/Si atomic ratio of 0.15 to 0.4;
   a $H_2O$/Si ratio of 20 to 60;
   b) calcining a product from a) and contacting with an acidic aluminium solution to form an aluminosilicate, or contacting a product from a) with an acidic solution, heating and contacting with an acidic aluminium solution to form an aluminosilicate.

7. A process according to claim 6, in which the template/Si weight ratio is 0.22 to 0.28.

8. A process according to claim 5, in which the zeolite precursor with structural type CON is in borosilicate form and is prepared by contacting a beta zeolite with structural type BEA containing boron in the substantial absence of alkaline ions with an organic template which is 1-N,N,N-trimethyl adamantammonium hydroxide, heating and calcining a product obtained;
   wherein the contacting is conducted with
   a B/Si atomic ratio of the zeolite of 0.02 to 0.2;
   a template/Si atomic ratio of the zeolite of 0.15 to 0.4; and
   a $H_2O$/Si ratio of the zeolite of 20 to 60.

9. A process according to claim 5, in which the zeolite precursor with structural type CON is in aluminosilicate form, and is prepared by
   a) contacting a beta zeolite with structural type BEA containing boron in the substantial absence of alkaline ions with an organic template which is 2-N,N,N-trimethyl adamantammonium hydroxide and heating,
   wherein contacting is conducted with
   a B/Si atomic ratio of the zeolite of 0.02 to 0.2;
   a template/Si atomic ratio of the zeolite of 0.15 to 0.4;
   a $H_2O$/Si ratio of 20 to 60;
   b) calcining a product from a) and contacting with an acidic aluminium solution to form an aluminosilicate, or contacting a product from a) with an acidic solution, heating and contacting with an acidic aluminium solution to form an aluminosilicate.

10. A process according to claim 5, in which the zeolite precursor with structural type CON is in borosilicate form, and is prepared:
    by contacting a beta zeolite with structural type BEA containing boron in the substantial absence of alkaline ions with an organic template which is 2-N,N,N-trimethyl adamantammonium hydroxide and heating;
    wherein contacting is conducted with
    a B/Si atomic ratio of 0.02 to 0.2;
    a template/Si atomic ratio of 0.15 to 0.4;
    a $H_2O$/Si ratio of 30 to 60; and calcining a product obtained.

11. A process according to claim 5, in which the zeolite precursor with structural type CON is in aluminosilicate form, and is prepared by:
    a) contacting a beta zeolite with structural type BEA containing boron in the substantial absence of alkaline ions with an organic template which is 2-N,N,N-trimethyl adamantammonium hydroxide and heating;
    wherein contacting in a) is conducted with
    a B/Si atomic ratio of the zeolite of 0.02 to 0.2;
    a template/Si atomic ratio of 0.10 to 0.4;
    a $H_2O$/Si ratio of 20 to 60;
    b) calcining a product from a) with an acidic aluminium solution to form an aluminosilicate, or contacting a product from a) with an acidic solution, heating and contact a heated product with an acidic aluminium solution to form an aluminosilicate.

12. A process according to claim 5, in which the zeolite precursor with structural type CON is in borosilicate form, and is prepared by:

contacting a beta zeolite with structural type BEA containing boron in the substantial absence of alkaline ions with an organic template which is 2-N,N,N-trimethyl adamantammonium hydroxide and heating;

wherein contacting is conducted with:
  a B/Si atomic ratio of the zeolite of 0.06 to 0.2;
  a template/Si atomic ratio of 0.10 to 0.4;
  a $H_2O$/Si ratio of 20 to 60; and calcining a product obtained.

13. A process according to claim 5, in which the zeolite precursor is in aluminosilicate form and is a SSZ-26 zeolite, a SSZ-33 zeolite exchanged with aluminium or a CIT-1 zeolite exchanged with aluminium.

14. A process according to claim 5, in which the zeolite precursor is in borosilicate form and is a SSZ-33 zeolite or a CIT-1 zeolite.

15. A catalytic composition comprising a zeolite according to claim 1 and a cracking catalyst other than said zeolite.

16. A composition according to claim 15, comprising:
  a) 0.1% to 60% by weight of at least one zeolite other than a zeolite according to the invention;
  b) 0.01% to 60% of at least one zeolite with structural type CON in its hydrogen form; and
  c) at least one matrix.

17. A compound according to claim 16, wherein the zeolite other than the zeolite according to the invention is a Y zeolite with faujasite structure.

18. A process for the catalytic cracking of a hydrocarbon feedstock comprising contacting said feedstock under cracking conditions with the catalyst of claim 15.

19. A process for the catalytic cracking of a hydrocarbon feedstock comprising contacting said feedstock under cracking conditions with the zeolite of claim 1.

* * * * *